United States Patent [19]

Price

[11] 4,405,028
[45] Sep. 20, 1983

[54] DRIVE SYSTEM FOR ELECTRIC VEHICLES

[76] Inventor: Cosby G. Price, 6403 N. Walrond, Gladstone, Mo. 64119

[21] Appl. No.: 275,113

[22] Filed: Jun. 18, 1981

[51] Int. Cl.³ .............................................. B60K 1/00
[52] U.S. Cl. .................................... 180/65 E; 290/45; 310/115; 318/140
[58] Field of Search .................... 180/65.1, 65.4, 65.6, 180/65.7, 65 E; 310/115; 318/139, 140; 320/61; 290/45; 74/230.17 A

[56] References Cited

U.S. PATENT DOCUMENTS

| 3,267,311 | 8/1966 | Lamparty | 310/115 |
| 3,514,681 | 5/1970 | Dorn et al. | 180/65.1 X |
| 4,130,172 | 12/1978 | Moody | 180/65.6 |

FOREIGN PATENT DOCUMENTS

| 47403 | 6/1933 | Denmark | 180/65.6 |
| 2709936 | 9/1977 | Fed. Rep. of Germany | 180/65.6 |

*Primary Examiner*—Joseph F. Peters, Jr.
*Assistant Examiner*—Michael Mar
*Attorney, Agent, or Firm*—John A. Hamilton

[57] ABSTRACT

A drive system for an electric vehicle including an electric motor having a rotatable case and a counter-rotating armature, one being operatively connected to the ground-engaging drive wheels of the vehicle, and one being operatively connected to an electric generator, and rechargeable electric storage batteries connected to the motor to drive it, the generator output being connected in re-charging relation to the batteries. A speed control consists of a drive train whereby the wheel-drive element of the motor may drive the generator-drive element of the motor, thereby stabilizing the speed of the former, whenever the former reaches or exceeds a speed representing a given vehicle speed. A continuously adjustable transmission in this drive train, manually controlled, permits ready adjustment of the vehicle speed.

3 Claims, 1 Drawing Figure

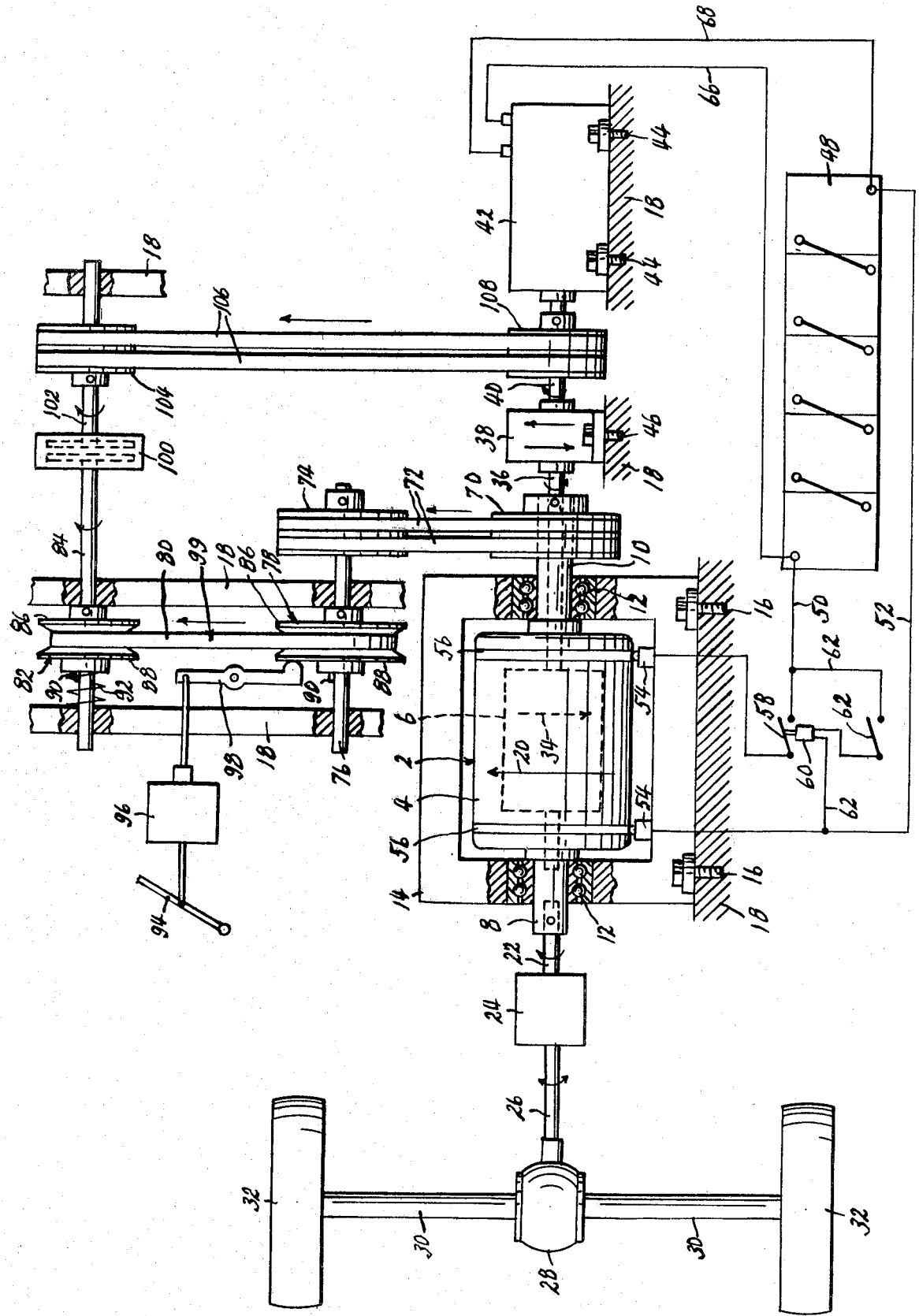

DRIVE SYSTEM FOR ELECTRIC VEHICLES

This invention relates to new and useful improvements in drive systems for electric vehicles, in particular that type of electric vehicle in which the ground-engaging drive wheels of the vehicle are driven by an electric motor powered by electric storage batteries.

A common and virtually universal disadvantage of vehicles of this type, despite the obvious advantages of atmospheric pollution reduction, and conservation of scarce petroleum fuels, has been the extremely large bulk and weight of the storage batteries required to provide even a barely acceptable driving range of 50 or 75 miles before recharging of the batteries is required, and that during the recharging the vehicle must be immobilized while connected to a suitable source of electric power. Accordingly, a principal object of the present invention is the provision of a drive system providing for continuous recharging of the batteries during normal vehicle operation, to an extent sufficient to provide a substantial reduction of the number, and hence of the bulk and weight, of the storage batteries which must be carried, and to provide a substantial increase in the driving distance which may be traversed before re-charging of the batteries is required. Generally, this object is accomplished by the provision of a drive motor having a rotatable case and counter-rotating armature, each driven by the reactive force of the other, with the case being connected to the ground-engaging vehicle drive wheels through a suitable drive train, and the armature being connected in driving relation to an electric generator the output of which is connected in charging relation to a bank of storage batteries which power the motor. Only that portion of the motor output required to drive the vehicle at any given moment is used for that purpose, while the remaining output is utilized in recharging the batteries.

Another defect of the usual system is that the speed of vehicle is generally regulated by stepped resistances in the motor circuit, with the result that much of the electrical energy is wasted in the generation of heat in the resistors. Accordingly, a further object of the present invention is the provision of a system of the character described including a speed control device which does not utilize resistors, but uses only that proportion of the motor output required for turning the drive wheels at any given speed, while diverting any remaining motor output to be used in the generation of additional electric power for charging the batteries. Generally, this object is accomplished by providing a direct driving connection between the motor case and generator armature operable to drive the generator whenever the case reaches or exceeds a speed corresponding to a given vehicle speed. This stabilizes the speed of the case by depriving it of any additional motive power, while diverting any power not then needed to drive the vehicle to the generation of electric power for recharging the batteries. A continuously adjustable transmission device in the driving connection permits adjustment of the vehicle speeds at which said connection takes over the driving of the generator.

Other objects are simplicity and economy of construction, and efficiency and dependability of operation.

With these objects in view, as well as other objects which will appear in the course of the specification, reference will be had to the accompanying drawing, wherein the single view is a partially structural and partially diagrammatic representation of a drive system for electric vehicles embodying the present invention.

In the drawing, the numeral 2 applies generally to an electric motor of a suitable type having a case 4 which carries the motor field windings, not shown, and an armature 6, which carries the armature windings, in a manner well known in the art. Case 4 is provided at its respectively opposite ends with coaxial spindles 8 and 10 which are rotatably mounted by means of ball bearings 12 in a heavy frame 14 which is rigidly mounted as by screws 16 on a fixed portion of the vehicle frame 18, whereby said case may turn in the direction of arrow 20. Spindle 8 is operatively connected by a drive shaft 22, a transmission gear box 24 which may provide any desired number of forward speeds as well as a reverse gear, a drive shaft 26, a differential gear box 28 and axles 30 to ground-engaging drive wheels 32 of the vehicle. Motor armature 6 is coaxially rotatable in case 4, in the direction of arrow 34, and its drive shaft 36 projects coaxially and rotatably outwardly through case spindle 10, which is tubular, and is connected at its outer end to the input of a gear box 38 which serves solely to reverse the rotation of shaft 36, so that the output shaft 40 of said gear box turns in the same direction as motor case 4. Shaft 40 is the input shaft of an electric generator 42, and turns the armature of said generator. Said generator is mounted by screws 44 on vehicle frame 18, as is gear box 38 by means of screw 46.

Electric power is supplied to motor 2 by a bank of storage batteries 48 through wires 50 and 52, which are connected to brushes 54 mounted on motor frame 14 and have sliding engagement with contact rings 56 mounted on motor case 4. It will further be understood that current supply to armature 6 is accomplished by internal brushes between the case and the armature, not shown but well understood in the art. Interposed in wire 50 is a main switch 58 for turning the motor on and off. Since the motor current may be quite heavy, it is desirable that switch 58 be disposed at a position remote from the driver, and that it be operated by a solenoid 60 connected across wires 50 and 52 by a conductor 62 in which a manual switch 64 is interposed, said switch being readily accessible to the driver. The solenoid may be of high resistance, so that switch 64 carries only a small current. The electrical output of generator 42 is connected in charging relationship to batteries 48 by wires 66 and 68.

In operation of the system as thus far described, it will be apparent that motor 2 is energized by the closure of switch 58, and that when energized, its armature 6 tends to turn in one direction (arrow 34) to drive generator 42 to recharge batteries 48, while the reactive force tends to turn its case 4 in the opposite direction (arrow 20), with equal torque, to turn wheels 32 to move the vehicle. Thus the batteries are constantly recharged during normal operation of the vehicle. Moreover, the differential between the rotational speeds of the motor case and armature tends to remain constant for any given load exerted on the motor in turning wheels 32, and to be generally directly proportional to changes in said load, increasing as said load increases and decreasing as said load decreases. Therefore, any change in the load exerted on the motor to turn wheels 32 will produce corresponding increases or decreases in the motor output available to drive the generator, but the generator will at all times be driven to furnish electricity tending to recharge the batteries. Of course, the motor is performing two load functions at this time, both driving wheels 32 and also generator 42. The generator, turning at a given speed obviously cannot generate enough power even to drive a single-load motor with enough power to drive the generator at that speed, due to inevitable mechanical and electrical losses in the system, much less to carry the additional load of motor 2 used in turning wheels 32. Therefore, batteries 48 are necessary, and will be gradually depleted, so that they must be periodically recharged by other means. However, the constant recharging of the batteries by operation of generator 42 at all times, and also the utilization for this purpose of all output energy of the motor not required for driving wheels 32, effects substantial economies in the overall use of the available battery power, reducing the required number, bulk and weight of the required bank of batteries, and increasing the cruising range of the vehicle and the time intervals at which recharging is required.

Speed control of the system as thus far described could be obtained by different methods, such as for example as by interposing stepped or variable resistors in the motor circuit, as is common in many systems for this purpose. Such resistors, however, have the disadvantage of wasting substantial quantities of electrical energy in the generation of non-useful heat, and therefore impose an undesirable drain on the batteries. The present system provides a speed control not subject to this disadvantage. The present system includes a belt pulley 70 fixed on the extended end of motor case spindle 10, and operably connected by belts 72 to a belt pulley 74 fixed on a shaft 76 carried rotatably by vehicle frame 18. Also mounted on shaft 76 is a V-belt pulley 78 of variable diameter, operably connected by a V-belt 80 to a second variable V-belt pulley 82 mounted on a parallel shaft 84 also carried rotatably by frame 18. Each of the variable pulleys 78 and 82 comprises a fixed, tapered section 86 fixed on the associated shaft, and a second, confronting tapered section 88 mounted non-rotatably on the associated shaft but being keyed thereto, as at 90, for axial sliding movement thereon. The axial sliding permits adjustment of the effective diameter of the pulley. For any given setting of pulley 78, a spring 92 on shaft 84 urges movable section 88 of pulley 82 toward its fixed section 86 to increase the effective diameter thereof to maintain belt 80 taut. The effective diameter of pulley 78 is adjusted by a foot pedal 94, which acts if necessary through a power-assist device 96 to pivot a lever 98 pressing inwardly against the movable section 88 of said pulley, either to increase its diameter by forcing said movable section inwardly, or to allow it to decrease its diameter by allowing the movable section to be moved outwardly by spring 92 and the tension of belt 80. The variable pulleys 78 and 82, together with belt 80 and the controls for the pulleys, constitute a manually operable, continuously variable transmission, designated generally by the numeral 29, whereby the relative rotational speeds of shafts 76 and 84 may be varied. Shaft 84 is connected through a uni-directional clutch 100 to a shaft 102 in such a manner that while shaft 84 may drive shaft 102 so long as the former is tending to rotate faster than the latter, shaft 102 can in no event drive shaft 84, but will overrun. A belt pulley 104 fixed on shaft 102 is operably connected by belts 106 to a belt pulley 108 fixed on drive shaft 40 of generator 42.

In operation of the speed control system, it will be apparent that under normal motor load conditions, say when the vehicle is operating on a level roadway, there will be a generally constant differential between the case and armature speeds of the motor at any given vehicle speed, that any increase in the motor load, such as when the vehicle is moving uphill, will increase this differential speed, thus increasing the generator speed, and that when the motor load is decreased, as when the vehicle is moving downhill, or "coasting", the differential speed of the motor will be decreased, and the generator speed will be decreased. Transmission 99 functions to so adjust the relative speeds of shafts 76 and 84 that so long as the vehicle speed remains below a speed corresponding to the setting of pedal 94, shaft 84 turns slower than shaft 102, so that shaft 102 is not driven, and pulleys 104 and 108, together with their belts 106, remain inoperative. However, as the vehicle speed approaches that represented by the setting of pedal 94, the speed of shaft 84 approaches that of generator drive shaft 40, so that clutch 100 engages and tends to drive the generator through belts 106, at a speed greater than that at which it tends to be driven by motor armature 6. The motor armature speed is then fixed at a given speed ratio with the motor case, and the vehicle speed will not increase past this point of "equilibrium", since any increase of vehicle speed, at any given load, would require an increase of this speed ratio, which in turn would require a reduction in the armature speed, which for the reasons given cannot occur. In effect, the speed control deprives the motor of the additional motive power which would be required for any higher vehicle speed. Variable transmission 99 provides means whereby the described point of "equilibrium" can be caused to occur at any desired vehicle speed. Any subsequent increase in the motor load will tend to slow the motor case speed, so that the case-armature differential speed may increase to satisfy the added load, until the vehicle speed again reaches the equilibrium point, while any decrease in the motor load will tend to increase the motor case speed, thus tending to decrease the case-armature speed differential to reduce the power output to wheels 32 until the vehicle speed again falls to the equilibrium point. In either case, any motor output not needed at any given moment to drive wheels 32 is automatically diverted to the operation of generator 42. When the vehicle is "coasting" downhill, motor 2 may even be shut off completely by opening switch 58, and the vehicle weight, acting through the speed control mechanism, will still drive the generator to further recharge the batteries.

What I claim as new and desire to protect by Letters Patent is:

1. A drive system for an electric vehicle having a frame and ground-engaging drive wheels, said drive system comprising:
    a. an electric motor the main elements of which consist of a case carrying the field windings of the motor and being rotatably mounted on the frame of said vehicle, and an armature carrying the armature windings of the motor and being rotatable in said case coaxially therewith, whereby when electric power is supplied to said motor said case and armature will rotate in opposite directions, each being driven by the reactive force of the other,
    b. rechargeable electric storage batteries operable to supply electric power to said motor,
    c. a first drive train operably connecting one of said main motor elements to said vehicle drive wheels, whereby the latter are driven by the former to propel said vehicle, the torque delivered to said power train by said motor being variable directly with the differential between the rotational speeds of said motor elements, d. an electric generator, e. a drive connection between the other of said main motor elements and said electric generator, whereby the latter is driven by the former, the electric output of said generator being connected in recharging relation to said storage batteries, f. a second drive train interconnecting the main motor element which is connected to said vehicle drive wheels by said first-named drive train to the input of said generator, whereby the latter may be driven by the former, in the same direction it is driven by the other of said motor elements, and g. a uni-directional clutch interposed in said second drive train and operable to prevent said generator from driving the motor element to which it is connected by said second drive train by reverse operation of said drive train, whereby as the vehicle speed reaches or exceeds a predetermined equilibrium level at which the speed of said wheel-drive motor element equals or exceeds the speed at which the generator is driven by the other motor element, said clutch will engage to drive said generator, thereby locking said motor elements at a fixed differential speed of rotation, which deprives the motor of the ability to generate the additional motive power which would be required to drive the vehicle at any speed higher than said equilibrium level.

2. A drive system as recited in claim 1 with the addition of a manually operable, continuously variable transmission device interposed in said second drive train, and operable to vary the speed of said wheel-drive motor element at which said second drive train will produce said equilibrium speed relative to the speed at which said generator is driven by the other of said motor elements, whereby the speed of said vehicle may be adjusted as desired.

3. A drive system as recited in claim 2 wherein said continuously variable transmission device comprises:

a. a pair of variable pulleys mounted on parallel shafts disposed successively in said second power train, b. a belt operably interconnecting said pulleys, and c. manually operable mechanical means operable to provide continuous but opposite adjustment of the effective diameters of said pulleys, whereby to adjust the relative rotational speeds of said pair of shafts.

* * * * *